(12) United States Patent
Cumic et al.

(10) Patent No.: US 11,274,777 B2
(45) Date of Patent: Mar. 15, 2022

(54) PIPE COUPLING

(71) Applicant: Romac Industries, Inc., Bothell, WA (US)

(72) Inventors: Branko Cumic, Bothell, WA (US); Andy Lemke, Bothell, WA (US)

(73) Assignee: Romac Industries, Inc., Bothell, WA (US)

( * ) Notice: Subject to any disclaimer, the term of this patent is extended or adjusted under 35 U.S.C. 154(b) by 318 days.

(21) Appl. No.: 16/283,502

(22) Filed: Feb. 22, 2019

(65) Prior Publication Data

US 2020/0271253 A1 Aug. 27, 2020
US 2021/0239243 A9 Aug. 5, 2021

Related U.S. Application Data

(63) Continuation of application No. 15/059,089, filed on Mar. 2, 2016, now Pat. No. 10,253,909, which is a (Continued)

(51) Int. Cl.
*F16L 21/06* (2006.01)
*F16L 21/00* (2006.01)
*F16L 21/02* (2006.01)

(52) U.S. Cl.
CPC ........... *F16L 21/065* (2013.01); *F16L 21/002* (2013.01); *F16L 21/02* (2013.01)

(58) Field of Classification Search
CPC ......... F16L 21/022; F16L 21/06; F16L 21/03; F16L 21/04; F16L 21/065; F16L 21/08;
(Continued)

(56) References Cited

U.S. PATENT DOCUMENTS 293,734 A 2/1884 Harrison
342,189 A 5/1886 Deeds
(Continued)

FOREIGN PATENT DOCUMENTS

AU 454905/93 A 3/1994
CA 628321 A 10/1961
(Continued)

OTHER PUBLICATIONS

American Pipe Manual, 19th ed., Section 9, "American Restrained Joint Pipe," Jul. 27, 2011, 36 pages.
(Continued)

*Primary Examiner* — Aaron M Dunwoody
(74) *Attorney, Agent, or Firm* — Seed Intellectual Property Law Group LLP

(57) ABSTRACT

A pipe coupling includes a sleeve and a clamping ring. The sleeve includes a flange at least one end. The clamping ring is mounted to the flange. The clamping ring carries a seal and includes two spaced apart bolt engagement portions. The clamping ring further includes two separate clamping ring portions that are removably connected together at a coupling portion of each respective separate clamping ring portion so that each clamping ring portion is separable from the other one. The two separate clamping ring portions function as a unitary ring when the coupling portions are brought into abutting contact such that the coupling portions are fixed relative to each other.

11 Claims, 11 Drawing Sheets

Related U.S. Application Data continuation of application No. 13/893,049, filed on May 13, 2013, now Pat. No. 9,303,801, which is a continuation of application No. 12/456,246, filed on Jun. 12, 2009, now Pat. No. 8,448,993.

(58) Field of Classification Search
CPC . F16L 21/02; F16L 17/04; F16L 17/06; F16L 17/02
USPC ........ 285/110, 111, 112, 113, 223, 236, 231, 285/419, 420, 400, 369, 337, 95, 365, 285/367, 366
See application file for complete search history.

(56) References Cited

U.S. PATENT DOCUMENTS

| | | |
|---|---|---|
| 703,657 A | 7/1902 | Horn |
| 1,622,768 A | 3/1927 | Cook et al. |
| 1,830,782 A | 11/1931 | Burnish et al. |
| 1,898,623 A | 2/1933 | Gammeter |
| 1,916,968 A | 7/1933 | Davis et al. |
| 2,197,450 A | 4/1940 | Curtis |
| 2,206,262 A | 7/1940 | Olt |
| 2,259,453 A | 10/1941 | Beyer et al. |
| 2,269,664 A | 1/1942 | Hallerberg |
| 2,355,408 A | 8/1944 | Wyss |
| 2,460,981 A | 2/1949 | Francisco, Jr. et al. |
| 2,541,205 A | 2/1951 | Christophersen |
| 2,645,506 A | 7/1953 | Sturgis |
| 2,647,769 A | 8/1953 | Smith |
| 2,741,497 A | 4/1956 | Risley |
| 2,755,109 A | 7/1956 | Risley |
| 2,778,661 A | 1/1957 | Leighton |
| 2,822,190 A | 2/1958 | Burke |
| 2,923,308 A | 2/1960 | Shohan |
| 2,937,037 A | 5/1960 | Woolsey |
| 2,985,291 A | 5/1961 | Schoepe et al. |
| 3,001,567 A | 9/1961 | Barr |
| 3,021,584 A | 2/1962 | Polanski |
| 3,026,128 A | 3/1962 | Willis |
| 3,029,946 A | 4/1962 | Wright, Jr. et al. |
| 3,033,581 A | 5/1962 | Sims |
| 3,059,941 A | 10/1962 | Kaynor et al. |
| 3,113,791 A | 12/1963 | Frost et al. |
| 3,124,367 A | 3/1964 | Kaynor |
| 3,129,021 A | 4/1964 | Willis et al. |
| 3,150,876 A | 9/1964 | Lafferty |
| 3,250,538 A | 5/1966 | Albon |
| 3,251,615 A | 5/1966 | Short, III |
| 3,291,506 A | 12/1966 | Blakeley |
| 3,298,698 A | 1/1967 | Condon |
| 3,301,567 A | 1/1967 | Barr |
| 3,315,970 A | 4/1967 | Holloway |
| 3,351,352 A | 11/1967 | Blakeley et al. |
| 3,386,745 A | 6/1968 | Hein |
| 3,423,111 A | 1/1969 | Elsner |
| 3,432,189 A | 3/1969 | Buller |
| 3,464,722 A | 9/1969 | Larkin |
| 3,476,410 A | 11/1969 | Pastva, Jr. |
| 3,485,515 A | 12/1969 | Frishof |
| 3,486,772 A | 12/1969 | Elsner |
| 3,680,894 A | 8/1972 | Young |
| 3,695,638 A | 10/1972 | Blakeley |
| 3,705,737 A | 12/1972 | Westerlund et al. |
| 3,724,878 A | 4/1973 | Ford |
| 3,724,880 A | 4/1973 | Seiler |
| 3,727,951 A | 4/1973 | Shire et al. |
| 3,733,092 A | 5/1973 | Yorke et al. |
| 3,744,825 A | 7/1973 | Cooper et al. |
| 3,756,629 A | 9/1973 | Gibb |
| 3,797,079 A | 3/1974 | Nixon |
| 3,810,665 A | 5/1974 | Rodgers |
| 3,828,403 A | 8/1974 | Perrin et al. |
| 3,838,873 A | 10/1974 | Gilbert |
| 3,877,733 A | 4/1975 | Straub |
| 3,920,270 A | 11/1975 | Babb, Jr. |
| 3,960,275 A | 6/1976 | Haughton et al. |
| 3,994,514 A | 11/1976 | Zimmerer et al. |
| 4,101,151 A | 7/1978 | Ferguson |
| 4,116,473 A | 9/1978 | Creus |
| 4,119,333 A | 10/1978 | Straub |
| 4,163,571 A | 8/1979 | Nash |
| 4,268,072 A | 5/1981 | Straub |
| 4,272,871 A | 6/1981 | Weinhold |
| 4,326,737 A | 4/1982 | Lehmann |
| 4,362,323 A | 12/1982 | Lodder et al. |
| 4,364,588 A | 12/1982 | Thompson |
| 4,373,235 A | 2/1983 | Korgaonkar |
| 4,380,348 A | 4/1983 | Swartz |
| 4,402,533 A | 9/1983 | Ortloff |
| 4,406,481 A | 9/1983 | Summerell |
| 4,421,347 A | 12/1983 | Kantor |
| 4,432,572 A | 2/1984 | Thalmann |
| 4,461,498 A | 7/1984 | Kunsman |
| 4,467,871 A | 8/1984 | Rollwitz |
| 4,471,979 A | 9/1984 | Gibb et al. |
| 4,480,860 A | 11/1984 | Foresta et al. |
| 4,494,780 A | 1/1985 | Burnett |
| 4,548,429 A | 10/1985 | Merz |
| 4,561,678 A | 12/1985 | Kunsman |
| 4,568,112 A | 2/1986 | Bradley, Jr. et al. |
| 4,568,115 A | 2/1986 | Zimmerly |
| 4,569,542 A | 2/1986 | Anderson et al. |
| 4,629,217 A | 12/1986 | Straub |
| 4,639,020 A | 1/1987 | Rung et al. |
| 4,643,461 A | 2/1987 | Thau, Jr. et al. |
| 4,643,464 A | 2/1987 | Weinhold |
| 4,678,208 A | 7/1987 | De Raymond |
| 4,685,705 A | 8/1987 | Jones |
| 4,699,405 A | 10/1987 | Miller |
| 4,702,499 A | 10/1987 | DeRaymond et al. |
| 4,702,500 A | 10/1987 | Thau, Jr. et al. |
| 4,702,886 A | 10/1987 | Kent |
| 4,729,582 A | 3/1988 | Zeidler |
| 4,753,461 A | 6/1988 | Miller |
| 4,807,912 A | 2/1989 | Maier |
| 4,810,832 A | 3/1989 | Spinner et al. |
| 4,813,720 A | 3/1989 | Cassel |
| 4,822,083 A | 4/1989 | Meinig |
| 4,824,148 A | 4/1989 | Grabowski |
| 4,838,582 A | 6/1989 | Hatakeyama et al. |
| 4,886,304 A | 12/1989 | Kunsman |
| 4,893,843 A | 1/1990 | DeRaymond |
| 4,915,418 A | 4/1990 | Palatchy |
| 4,919,453 A | 4/1990 | Halling et al. |
| 4,940,261 A | 7/1990 | Somers Vine |
| 5,018,768 A | 5/1991 | Palatchy |
| 5,036,636 A | 8/1991 | Hasty |
| 5,100,183 A | 3/1992 | Montesi et al. |
| 5,180,193 A | 1/1993 | Rung et al. |
| 5,203,594 A | 4/1993 | Straub |
| 5,230,537 A | 7/1993 | Newman |
| 5,248,169 A | 9/1993 | Barbe |
| 5,257,834 A | 11/1993 | Zeidler et al. |
| 5,271,648 A | 12/1993 | Krausz |
| 5,273,322 A | 12/1993 | Straub |
| 5,310,158 A | 5/1994 | Cassel |
| 5,314,213 A | 5/1994 | Heister et al. |
| 5,335,946 A | 8/1994 | Dent et al. |
| 5,339,846 A | 8/1994 | Shelton et al. |
| 5,358,286 A | 10/1994 | Eaton et al. |
| 5,409,042 A | 4/1995 | Kirchner |
| 5,431,453 A | 7/1995 | Yamashita et al. |
| 5,476,290 A | 12/1995 | Bergmann et al. |
| 5,476,292 A | 12/1995 | Harper |
| 5,499,849 A | 3/1996 | Fend |
| 5,509,702 A | 4/1996 | Warehime et al. |
| 5,560,656 A | 10/1996 | Okamura et al. |
| 5,588,267 A | 12/1996 | Rodriguez et al. |
| 5,645,303 A | 7/1997 | Warehime et al. |
| 5,697,194 A | 12/1997 | Gignac |
| 5,772,253 A | 6/1998 | Hodge et al. |
| 5,803,513 A | 9/1998 | Richardson |
| 5,815,892 A | 10/1998 | Geppert |

(56) References Cited

U.S. PATENT DOCUMENTS

| | | |
|---|---|---|
| 5,911,446 A | 6/1999 | McLennan et al. |
| 5,941,576 A | 8/1999 | Krausz |
| 5,992,905 A | 11/1999 | Kennedy et al. |
| 6,053,504 A | 4/2000 | Winterhoff et al. |
| 6,070,914 A | 6/2000 | Schmidt |
| 6,089,618 A | 7/2000 | Neumann et al. |
| 6,106,029 A | 8/2000 | DeMore et al. |
| 6,186,560 B1 | 2/2001 | Gill |
| 6,279,963 B1 | 8/2001 | Hulsebos |
| 6,293,556 B1 | 9/2001 | Krausz |
| 6,311,712 B1 | 11/2001 | Meyer |
| 6,390,122 B1 | 5/2002 | Zhang et al. |
| 6,470,538 B2 | 10/2002 | Richter |
| 6,481,755 B2 | 11/2002 | Hulsebos et al. |
| 6,481,762 B1 | 11/2002 | Rex et al. |
| 6,533,331 B2 | 3/2003 | Hulsebos et al. |
| 6,533,333 B1 | 3/2003 | Radzik |
| 6,595,235 B1 | 7/2003 | Zhang |
| 6,789,567 B2 | 9/2004 | Meyer |
| 6,830,268 B2 | 12/2004 | Krausz et al. |
| 6,843,514 B2 | 1/2005 | Rex et al. |
| 6,921,115 B2 | 7/2005 | Gill |
| 6,983,764 B2 | 1/2006 | Arrowood, Jr. et al. |
| 7,036,850 B2 | 5/2006 | Gill |
| 7,048,309 B2 | 5/2006 | Gill |
| 7,125,054 B2 | 10/2006 | Jones |
| 7,232,160 B2 | 6/2007 | Krausz et al. |
| 7,243,955 B2 | 7/2007 | Krausz et al. |
| 7,252,310 B2 | 8/2007 | Amedure et al. |
| 7,300,078 B2 | 11/2007 | Yamamoto et al. |
| 7,310,867 B2 | 12/2007 | Corbett, Jr. |
| 7,328,493 B2 | 2/2008 | Jones et al. |
| 7,353,843 B2 | 4/2008 | Arrowood, Jr. et al. |
| 7,455,331 B2 | 11/2008 | Gill |
| 7,571,940 B2 | 8/2009 | Krausz et al. |
| 7,625,018 B2 | 12/2009 | Krausz et al. |
| 7,654,586 B2 | 2/2010 | Krausz et al. |
| 7,748,753 B2 | 7/2010 | Krausz et al. |
| 7,789,431 B2 | 9/2010 | Freudendahl |
| 7,815,225 B2 | 10/2010 | Jones et al. |
| 7,828,335 B2 | 11/2010 | Gill |
| 7,837,238 B2 | 11/2010 | Krausz et al. |
| 7,837,239 B2 | 11/2010 | Krausz et al. |
| 7,850,213 B2 | 12/2010 | Gill |
| 7,997,626 B2 | 8/2011 | Krausz et al. |
| 8,186,723 B2 | 5/2012 | Kim |
| 8,444,187 B2 | 5/2013 | Bekki |
| 8,505,985 B2 | 8/2013 | Nijsen et al. |
| 2002/0109355 A1 | 8/2002 | Elliott |
| 2004/0089349 A1 | 5/2004 | Meyer |
| 2004/0194836 A1 | 10/2004 | Arrowood, Jr. et al. |
| 2005/0082831 A1* | 4/2005 | Borland ............... F16L 21/065 285/369 |
| 2005/0146133 A1 | 7/2005 | Snyder et al. |
| 2006/0000598 A1 | 1/2006 | Arrowood, Jr. et al. |
| 2006/0192384 A1 | 8/2006 | Lundstrom |
| 2006/0214422 A1 | 9/2006 | Cuvo et al. |
| 2006/0265852 A1 | 11/2006 | Snyder et al. |
| 2006/0267343 A1 | 11/2006 | Wright |
| 2007/0024056 A1 | 2/2007 | Borland |
| 2007/0040336 A1 | 2/2007 | Sun et al. |
| 2007/0085341 A1 | 4/2007 | Walmsley et al. |
| 2007/0273151 A1 | 11/2007 | Krausz et al. |
| 2008/0272595 A1 | 11/2008 | Gibb et al. |
| 2010/0289256 A1 | 11/2010 | Shumard |
| 2010/0289257 A1 | 11/2010 | Madara et al. |
| 2010/0314864 A1 | 12/2010 | Lemke et al. |

FOREIGN PATENT DOCUMENTS

| | | |
|---|---|---|
| CA | 1 267 177 A | 3/1990 |
| CA | 2104553 A1 | 8/1990 |
| CH | 614905 A | 12/1977 |
| DE | 1 271 473 A | 6/1968 |
| DE | 21 588 16 A | 7/1972 |
| DE | 31 119 97 A1 | 10/1982 |
| DE | 32 376 27 A1 | 4/1984 |
| DE | 39 264 32 A1 | 2/1991 |
| DE | 44 221 16 C1 | 8/1995 |
| EP | 0 079 457 A1 | 5/1983 |
| EP | 0 223 668 A1 | 5/1987 |
| EP | 0 403 379 A1 | 12/1990 |
| EP | 0 492 921 A2 | 7/1992 |
| EP | 0 521 232 A1 | 1/1993 |
| EP | 0 551 548 A1 | 7/1993 |
| EP | 0 584 784 A1 | 3/1994 |
| FR | 1421443 A | 11/1965 |
| FR | 2775753 A1 | 9/1999 |
| GB | 748033 A | 4/1956 |
| GB | 749664 A | 5/1956 |
| GB | 1317758 A | 5/1973 |
| GB | 1334258 A | 10/1973 |
| GB | 1446718 A | 8/1976 |
| GB | 2051213 A | 1/1981 |
| GB | 2 094 385 A | 9/1982 |
| GB | 2 098 297 A | 11/1982 |
| GB | 2 453 608 A | 4/2009 |
| IL | 102960 A | 1/1995 |
| IL | 97236 A | 6/1997 |
| IL | 114078 A | 11/1997 |
| IL | 94399 A | 1/1999 |
| JP | 53-129716 U | 10/1978 |
| JP | 58-65483 U | 5/1983 |
| JP | 60-69885 U | 5/1985 |
| JP | 61-106685 U | 7/1986 |
| JP | 62-87283 U | 6/1987 |
| JP | 9-159086 A | 6/1997 |
| JP | 2005-42740 A | 2/2005 |
| JP | 2006-329290 A | 12/2006 |
| KR | 2003-0050647 A | 6/2003 |
| WO | 96/41983 A1 | 12/1996 |

OTHER PUBLICATIONS

Second Amended Complaint for Patent Infringement and Jury Demand, *Krausz Industries, Ltd. et al.* v. *Romac Industries, Inc. et al.*, U.S. District Court for the Western District of New York, Case No. 6:09-cv-06300-DGL.

EBAA Iron—Series 1100TDM, brochure, 2011, 4 pages.

JCM Mar. 2010 Product Directory SFS, catalog, Mar. 2010, 98 pages.

RINGWEJ Coupling System, Romac Industries Inc. catalog, 1974, 4 pages.

Sigma ONE-LOK™ Series D-SLCE for PVC Pipe, brochure, 2011, 4 pages.

Sigma ONE-LOK™ Series SLDE for Ductile Iron Pipe, brochure, 2011, 4 pages.

Sigma PV-LOK™ Series PWP for use on Ductile Iron Pipe, brochure, 2010, 2 pages.

Smith-Blair, catalog, Nov. 2011, 20 pages.

Tyler Union Utilities Catalog, Feb. 2008, 65 pages.

Uni-Flange Pipe Restraints and Adapter Flange, catalog, 2011, 60 pages.

Victaulic—Coupling Style 31, catalog, 2012, 3 pages.

\* cited by examiner

PIPE COUPLING

TECHNICAL FIELD

The invention disclosed here relates to a pipe coupling. The pipe coupling is adapted to join two large pipes together via a barrel sleeve that has clamping rings on each end. The clamping rings have seals adapted to join pipes having the same diameter or different diameters.

BACKGROUND OF THE INVENTION

There are many different types of pipe couplings and connectors for joining water, sewage, gas, and similar pipes. An example of one such coupling is disclosed in U.S. Pat. No. 5,941,576. The design disclosed here provides an alternative to the '576 design.

SUMMARY OF THE INVENTION

The invention disclosed here is an improved pipe coupling. The pipe coupling includes a cylindrical, barrel-shaped sleeve portion that has circumferential flanges at each end. The circumferential flanges face outwardly relative to the sleeve. Connected to each circumferential flange is a clamping ring.

In preferred form, the clamping rings are identical in construction. Each clamping ring carries a nested seal. Each clamping ring may consist of two separate portions, or halves, that are hinged together at the bottom, although variations are possible.

The hinge creates a pivot point so that each half of the clamping ring (or clamping ring portion) is moveable toward and away from the other one. However, the clamping ring portions are structurally configured so that they eventually become iron-bound near the pivot point at a certain rotational point, as the clamping ring portions move toward each other during closing or tightening. The iron-bounding effect causes the clamping ring portions to eventually function as a "unitary" ring instead of two separate freely-moving halves.

As an alternative, it may be possible to use the same concept in a clamping ring having several segments. In this instance, one segment or portion swings relative to another via a pivoting or similar connection. The two portions become iron-bound at a certain inward swing point.

As indicated above, for the two-part arrangement, each half of the clamping ring has an ear adapted to connect to a tightening bolt. The ears of each clamping ring portion are pulled together by the tightening bolt in a conventional manner. However, the ears are integrated with the structure of the clamping ring portions, as opposed to being separately welded or the like.

Each clamping ring carries a nested seal. According to the invention disclosed here, the nested seal includes an inner circumferential seal part that is separately nested within an outer circumferential seal part. The combination of these two seal parts creates an inwardly directed face that presses against an outwardly directed face of the corresponding barrel sleeve's circumferential flange.

The nested seal also has a sloping outer surface received within the clamping ring. The slope on the surface causes the seal to be urged toward the barrel sleeve's circumferential flange as the clamping ring is tightened.

The inner part of the nested seal has a plurality of outer peripheral ridges that mate with a corresponding plurality of inner peripheral grooves on the inside of the outer part of the seal. This permits the inner part to be removed easily from the outer part and allows the clamping rings to be adjusted to pipes of varying diameters.

The outer part of the seal also has an annular groove that faces the barrel sleeve's flange. The diameter of the annular groove is greater than the inner diameter of the barrel sleeve's flange, when in a non-compressed state. However, when the clamping ring is tightened about the circumferential flange on the sleeve, the seal is compressed down such that the annular groove becomes exposed to the interior diameter of the pipe.

Last, the cylindrical, barrel-shaped sleeve portion carries a handle. The sleeve is preferably designed to couple together the ends of two pipes having interior diameters within and including four to twelve inches. The handle allows for the pipe coupling to be physically manipulated (e.g., turned or held in position) much easier when it is used to couple pipes.

The features summarized above, including how they interact with each other, are further described below and in the accompanying drawings.

BRIEF DESCRIPTION OF THE DRAWINGS

In the drawings, like reference numerals and letters refer to like parts throughout the various views, unless indicated otherwise, and wherein.

DETAILED DESCRIPTION

Figure 1:
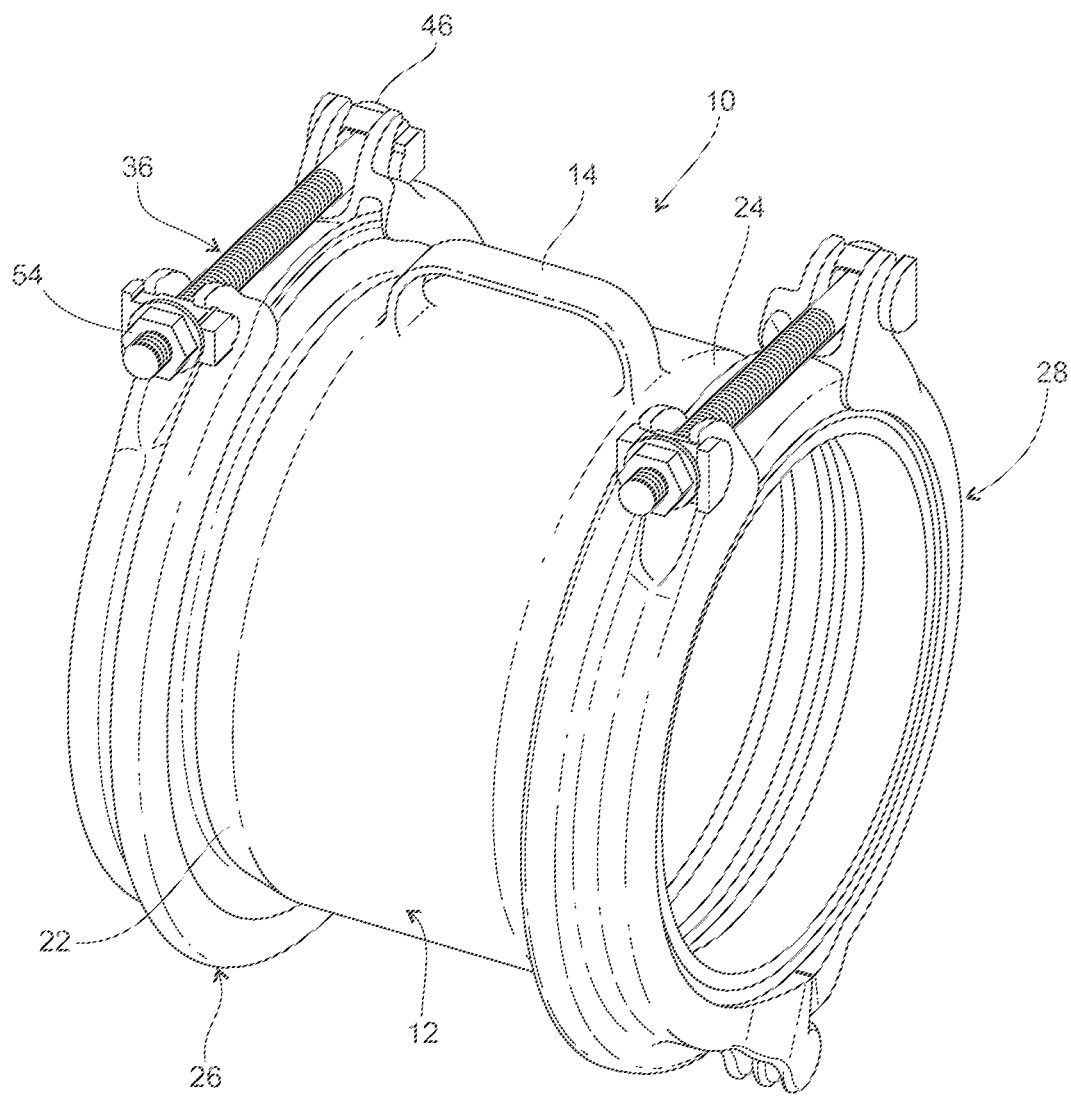
FIG. 1 is a perspective view of a pipe coupling constructed in accordance with a preferred embodiment of the present invention.

Referring now to the drawings, and first to FIG. 1, shown generally at 10 is a pipe coupling constructed in accordance with a preferred embodiment of the invention. The coupling 10 consists of a cylindrical, barrel-shaped sleeve 12.

Figure 2:
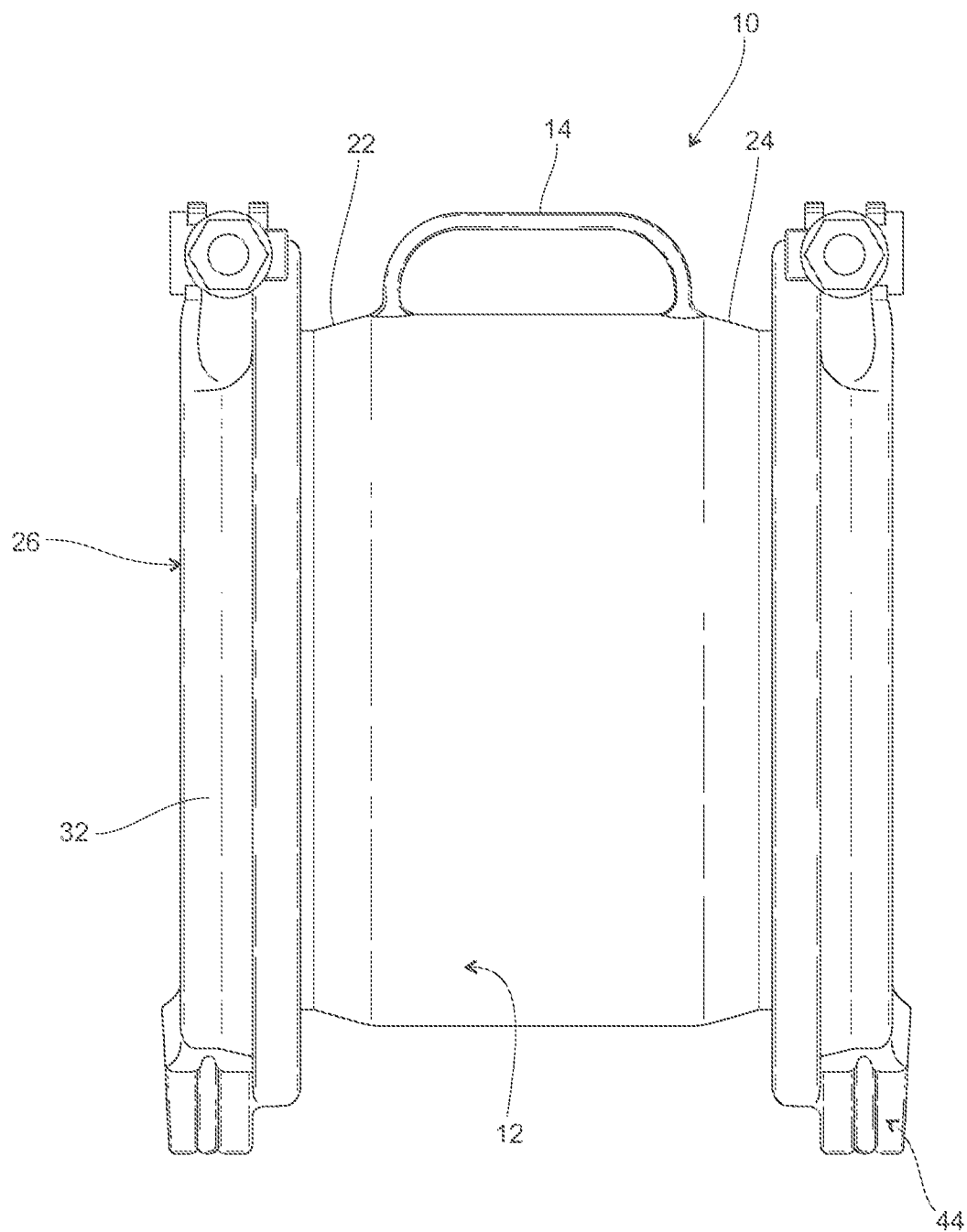
FIG. 2 is a side view of the pipe coupling shown in FIG. 1.
Figure 16:
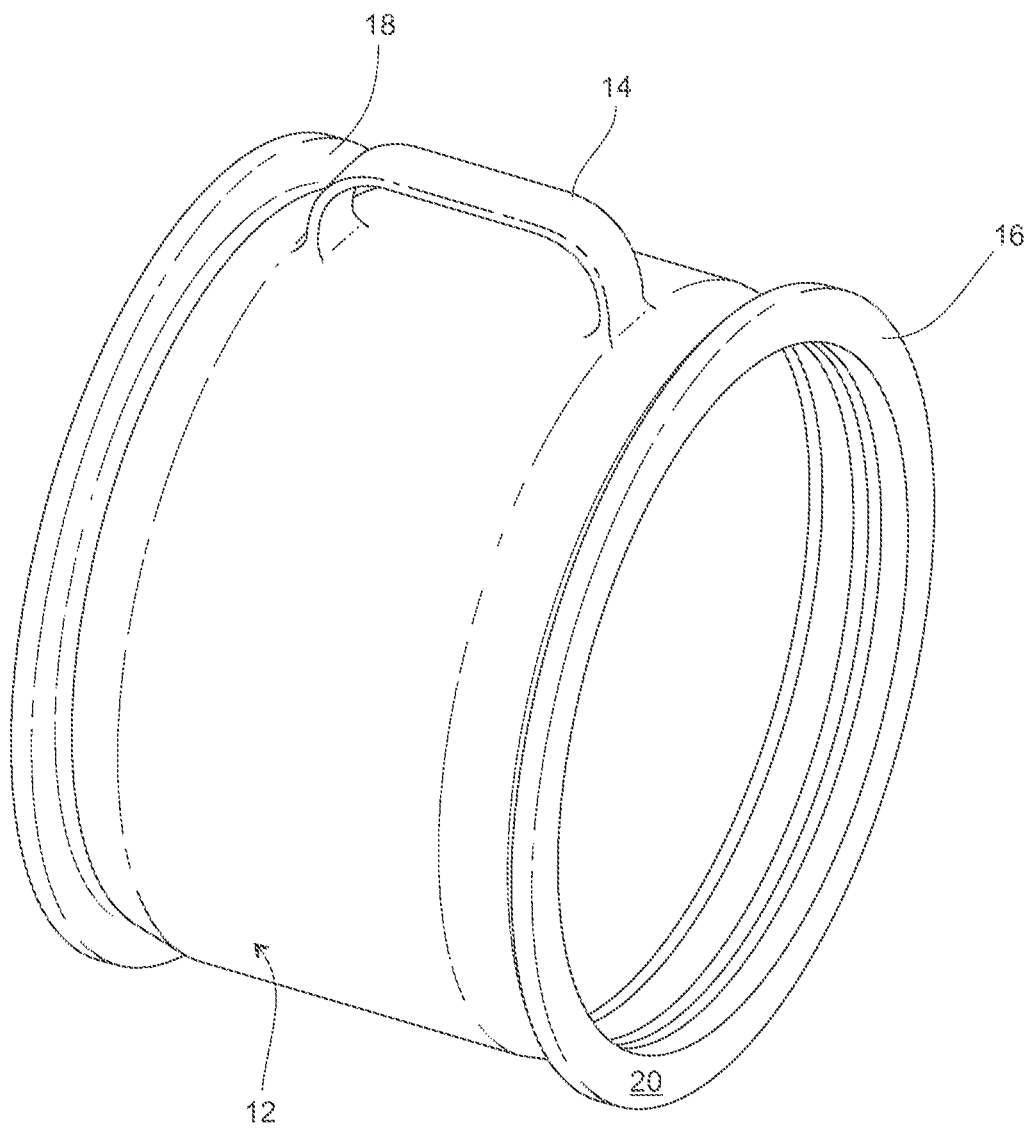
FIG. 16 is a pictorial view of the cylindrical barrel sleeve portion of the pipe coupling.

Referring briefly to FIG. 16, the barrel-shaped sleeve 12 has a carrying handle 14. Each end of the barrel-shaped sleeve 12 terminates in a circumferential flange 16, 18. Each flange 16, 18 presents an outwardly facing surface 20 (see FIG. 16). As can be seen in FIG. 2, the barrel sleeve 12 converges at 22, 24, respectively, toward each circumferential flange 16, 18 (not shown in FIG. 2).

Figure 3:
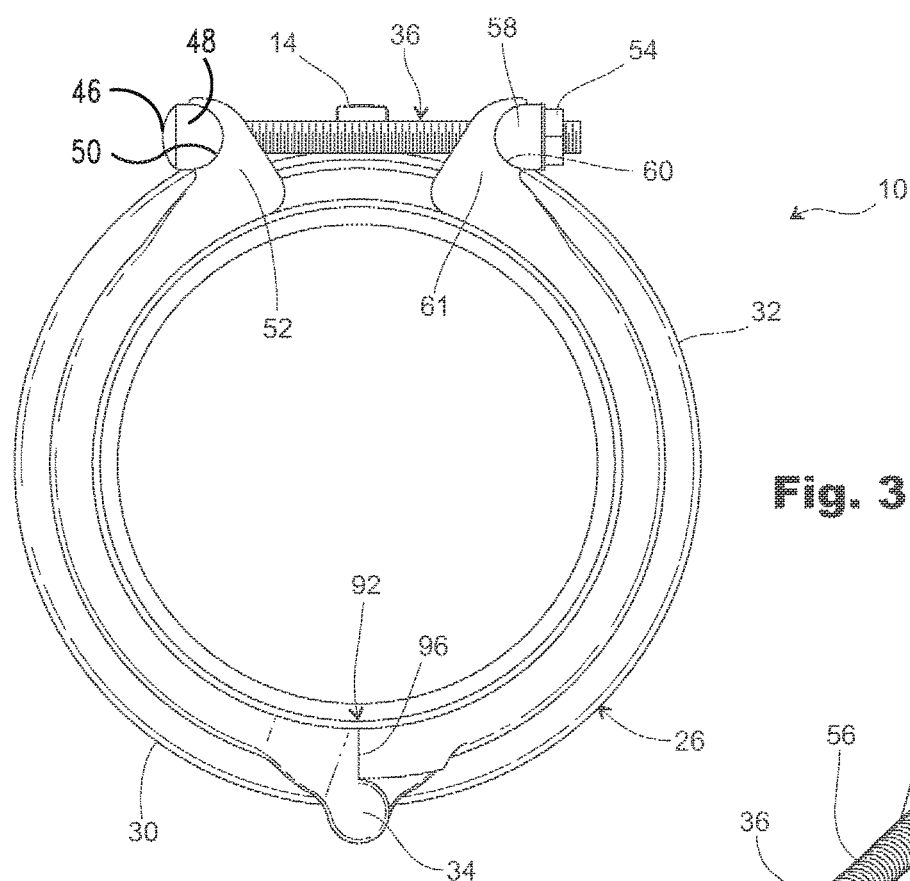
FIG. 3 is an end view of the pipe coupling shown in FIGS. 1 and 2.

In preferred form, and referring back to FIG. 1, a clamping ring (indicated generally at 26, 28) is connected to each circumferential flange 16, 18 on the sleeve 12. FIG. 3 is an endwise view of the pipe coupling 10 and shows only clamping ring 26. In the alternative view provided by FIG. 4, the clamping ring 26 is shown alone and disconnected from the pipe coupling 10.

In the embodiment described here, each clamping ring 26, 28 is identical. It is to be appreciated, however, that variations would involve making one clamping ring larger or smaller relative to the other. It might also be possible to use the clamping ring and seal design disclosed here in other kinds of pipe coupling applications. Nevertheless, because clamping rings 26, 28 are identical in the drawings, only one clamping ring 26 will be described.

The clamping ring 26 is made of two separate portions, or halves 30, 32. These portions are connected together at a pivot point 34 (see, e.g. FIG. 3). The pivot point 34 allows each part 30, 32 of the clamping ring 26 to open and/or close at the top as a bolt structure 36 (described later below) is respectively loosened or tightened.

Figure 14:
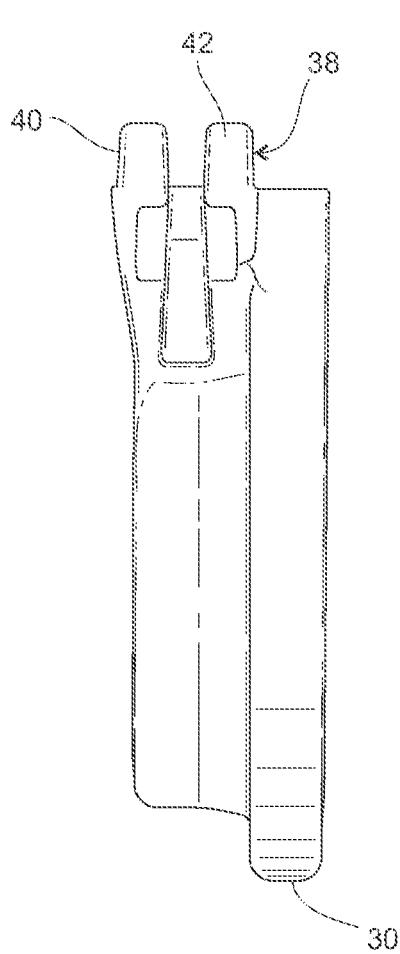
FIG. 14 is a bottom view of one clamping ring portion and shows the hinge part of a releasable pin and hinge connection that permits two separate clamp ring portions to rotate relative to each other.
Figure 15:
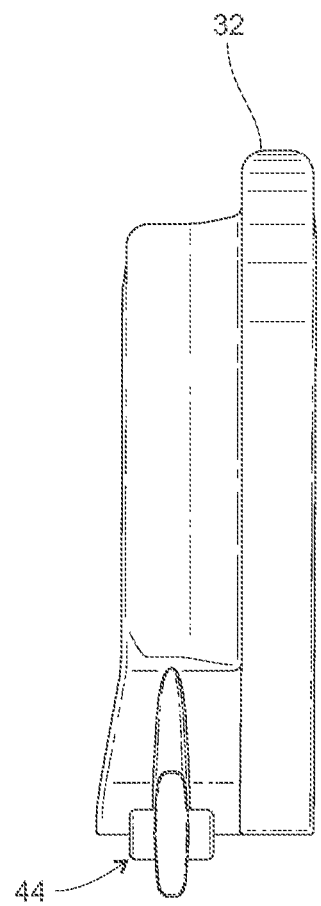
FIG. 15 is a view like FIG. 14, but shows the pin portion.

The pivotal connection 34 is created by the structure illustrated in FIGS. 14 and 15. These figures are views that depict the bottom side of clamping ring 26. One portion or half 30 of the clamping ring 26 has a hinge piece 38. The hinge piece 38 has forked hooks 40, 42 that capture a pin 44 on the bottom of the other clamping ring part 32. The hooks 40, 42 are easy to connect and disconnect to and from the pin 44 for completely separating the two halves, if desired.

Figure 5:
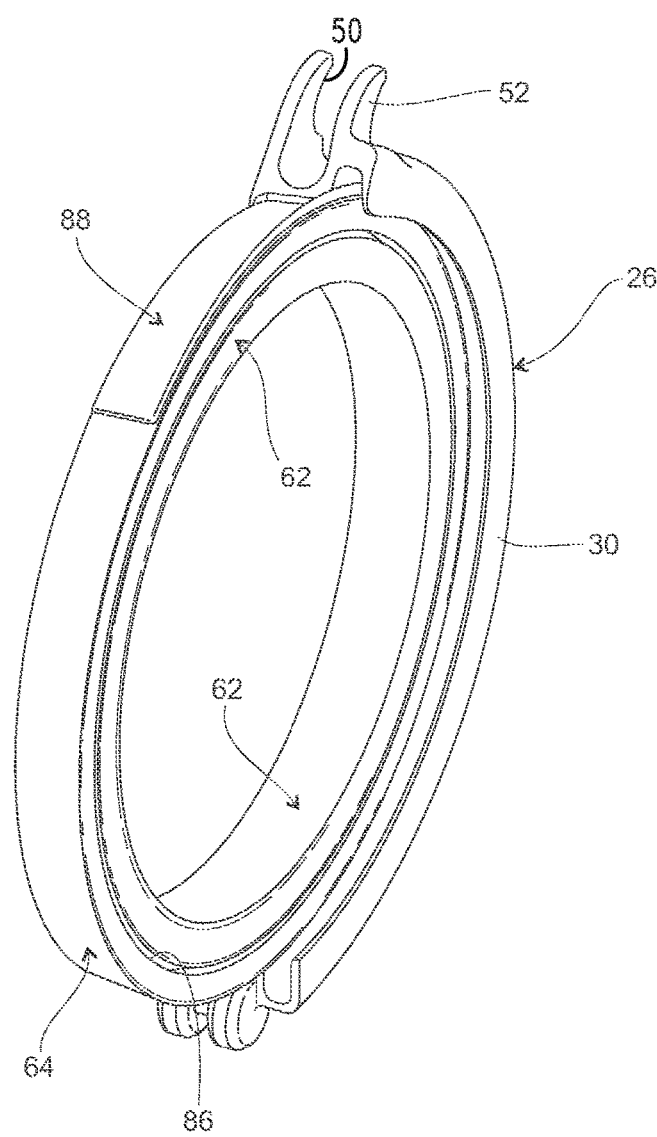
FIG. 5 is a view like FIG. 4, but reveals underlying nested seal and backing armor structure.
Figure 6:
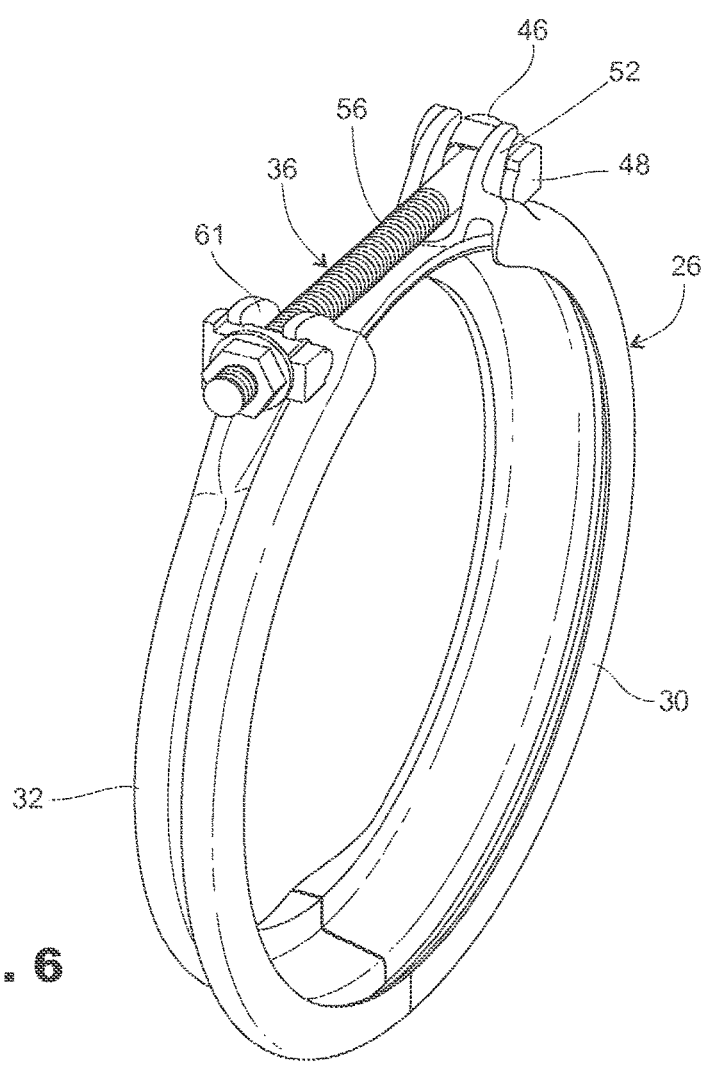
FIG. 6 is a view like FIG. 4, but with the nested seal removed.

Referring now to FIGS. 5 and 6, but first to FIG. 6, the clamping ring 26 is compressed around the barrel sleeve's circular flange 16 by the bolt structure 36. The bolt structure design is conventional. It includes a bolt head 46 that is captured by a bolt guide 48. The bolt guide 48 is curved and rests against a complementary curved surface 50 that is part of a clamping ring ear 52 (see FIG. 3). The ear 52 is made from the same piece of material (metal) that makes up the clamping ring portion 26. In other words, the ear 52 is structurally integrated or integrated with the structure of the clamping ring portion.

The other end of the bolt structure 36 has a nut 54 threaded onto the shaft 56 of bolt structure 36. The nut 54 similarly rests against a mirror bolt guide 58. Similar to the previous description, bolt guide 58 rests against a curved surface 60 on clamp ear 61.

Figure 9:
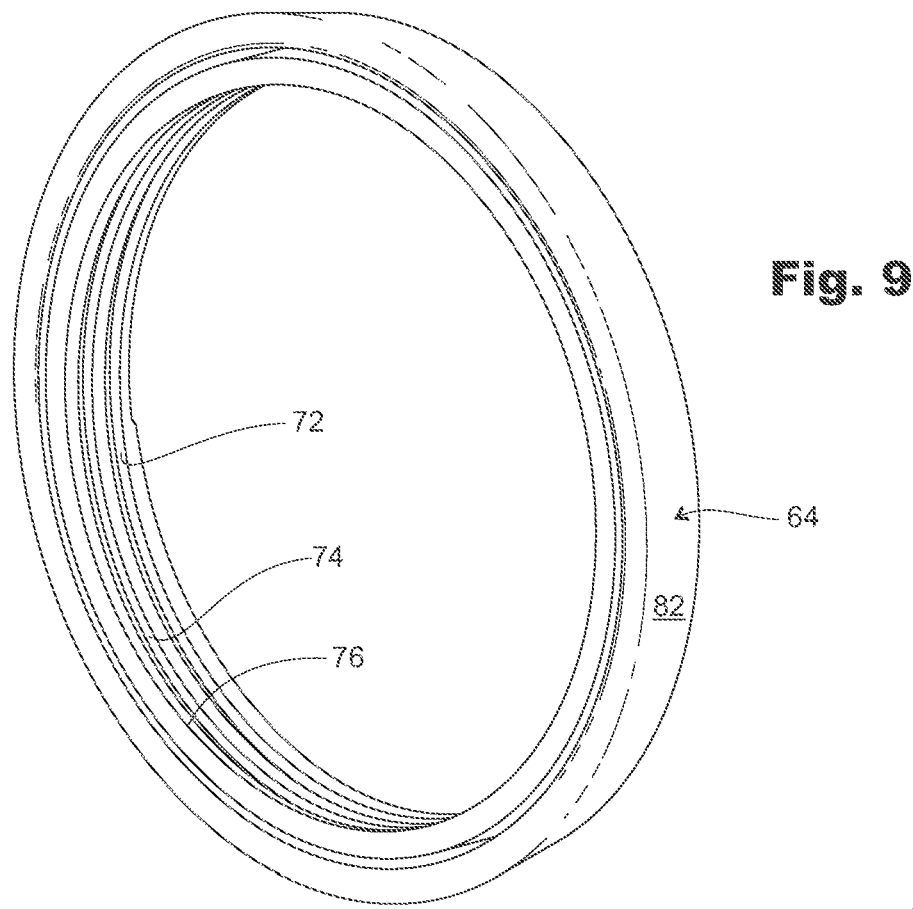
FIG. 9 is a pictorial view like FIG. 8, but taken at a different angle, and shows only the outer circumferential portion of the nested seal, with the inner circumferential portion having been removed.
Figure 10:
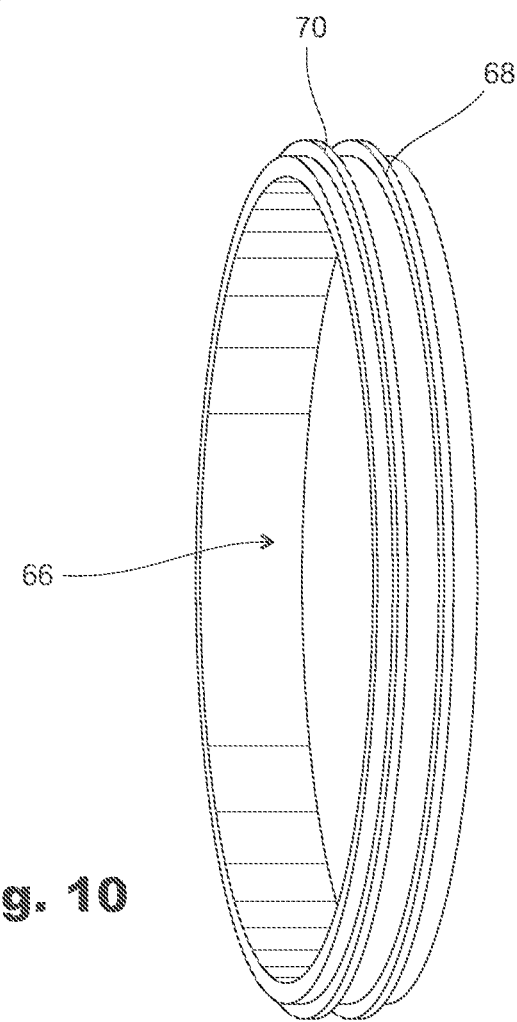
FIG. 10 is a pictorial view of the outer circumferential portion of the seal.

Referring once again to FIG. 4, the clamping ring 26 carries a nested seal, indicated generally at 62. The seal 62 is called "nested" because it has an outer circumferential seal part 64 (see FIG. 9) and an inner circumferential seal part 66 (see FIG. 10).

The inner seal 66 has a plurality of outer peripheral ridges 68, 70. These ridges mate with or fit within corresponding inner peripheral grooves 72, 74 on an inner surface 76 of the outer seal 64 part (see FIGS. 9 and 10). The arrangement of peripheral ridges 68, 70 and grooves 72, 74 help retain the inner seal 66 in position within the outer seal 64 thus creating the desired "nested" configuration.

The nested combination created by the inner and outer seal parts 66, 64 can be used to define an adjustable seal for capturing the end of pipes having variations in outer diameter. If desired, the inner seal 66 can be easily removed from the outer one 64, in the field, thereby adapting the clamp ring 26 to a larger pipe. The two seals 66, 64 are not joined together via an adhesive or other bonding agent. They exist as separate pieces. It is possible to reinstall the inner circumferential seal part 66, if desired.

Figure 12:
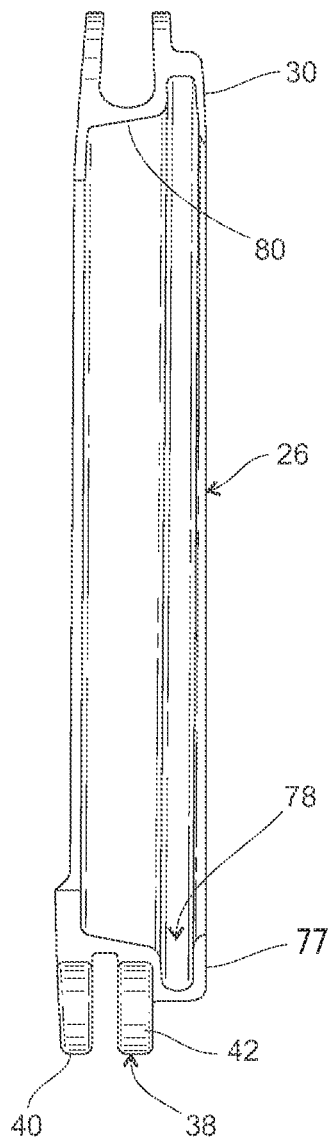
FIG. 12 is a side view of FIG. 11, but with the seal removed for the purpose of illustrating how the clamping ring is shaped to receive the nested seal.
Figure 13:
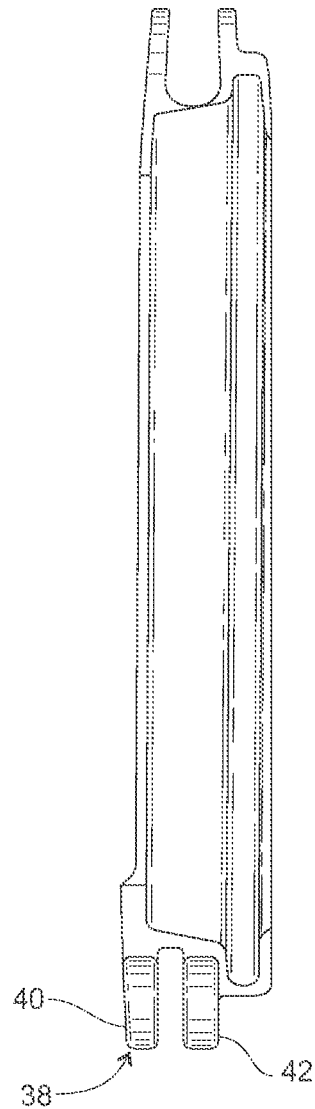
FIG. 13 is a side view of FIG. 11 and shows the nested seal in position within the clamping ring.

Referring now to FIG. 12, which shows the clamping ring part 30 without the nested seal 62, it can be seen that the clamping ring is generally conventional in cross section, except as described below. The clamping ring has an inner lip 77 that overlaps the barrel sleeve's circumferential flange 16 (not shown in FIG. 12). In other words, the circumferential flange rests within the space indicated by arrow 78 in FIG. 12. As would be apparent, removing the nut 54 from the end of the bolt structure 36 allows the clamping ring 26 to be opened sufficiently so that the clamping ring can be placed around the circumferential flange 16.

Outwardly of space 78 is a unique sloped surface 80 in which the nested seal 62 rests. The slope of surface 80 is convergent outwardly (toward the end of the pipe coupling 10). As the bolt structure 36 is tightened, it pulls clamp ears 52, 61 toward each other, thus compressing the nested seal 62. At the same time, the compression action also urges the sloped surface 80 of the clamping ring against the corresponding surface (also sloped) 82 of the nested seal (see FIG. 9). This, in turn, urges the seal 62 toward the circumferential flange 16.

Figure 4:
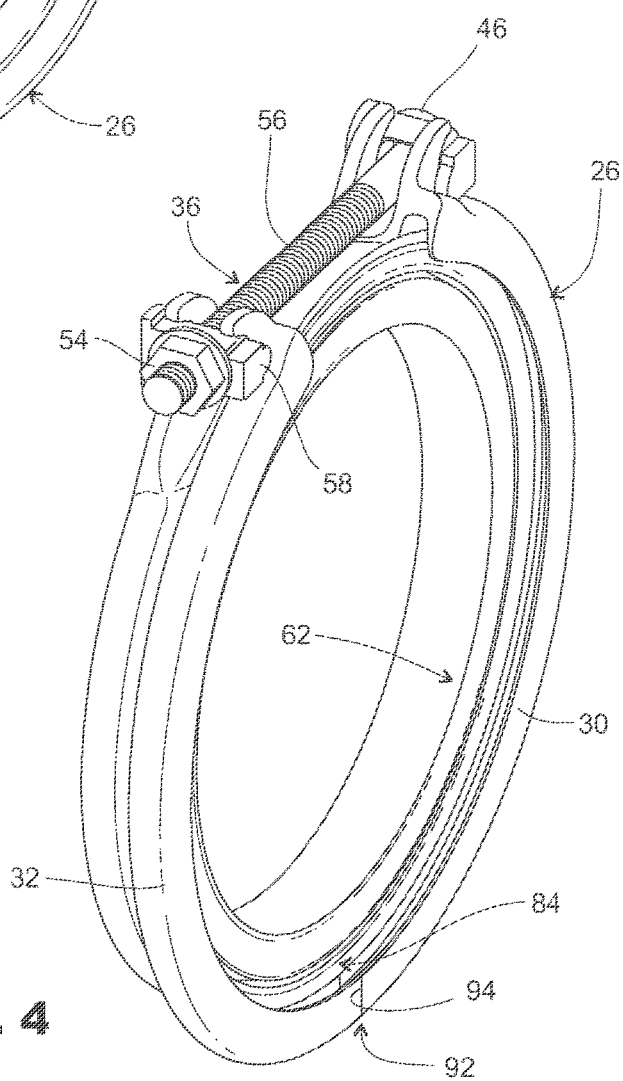
FIG. 4 is a perspective view of one of two clamping rings illustrated in FIGS. 1-3, with the clamping ring and related seal structure removed from the barrel sleeve portion of the pipe coupling.

Referring now to FIG. 4, the inwardly facing surface of the seal, indicated generally by arrow 84, is further urged or pressed against the outwardly facing surface 20 of the sleeve's circumferential flange (see FIG. 16). This collectively enhances sealing capability because not only is the nested seal 62 compressed around the outside diameter of the pipe, but it is also compressed axially into and against the barrel-sleeve's circumferential flange.

Next, the outer part 64 of seal 62 has an annular groove 86 that faces the barrel sleeve 12. When the clamping ring 26 is placed on its respective flange, and before tightening of the bolt structure 36, the seal 62 is in a non-compressed state. In this condition, the diameter of the annular groove 86 is preferably greater than the inner diameter of the barrel sleeve 12. When compressed, however, the annular groove 86 becomes likewise compressed so that its diameter becomes exposed to the inside of the barrel sleeve 12. This enables fluid pressure to cause one part of the seal to slide upon itself. It is believed this may improve upon seal efficiency.

Figure 7:
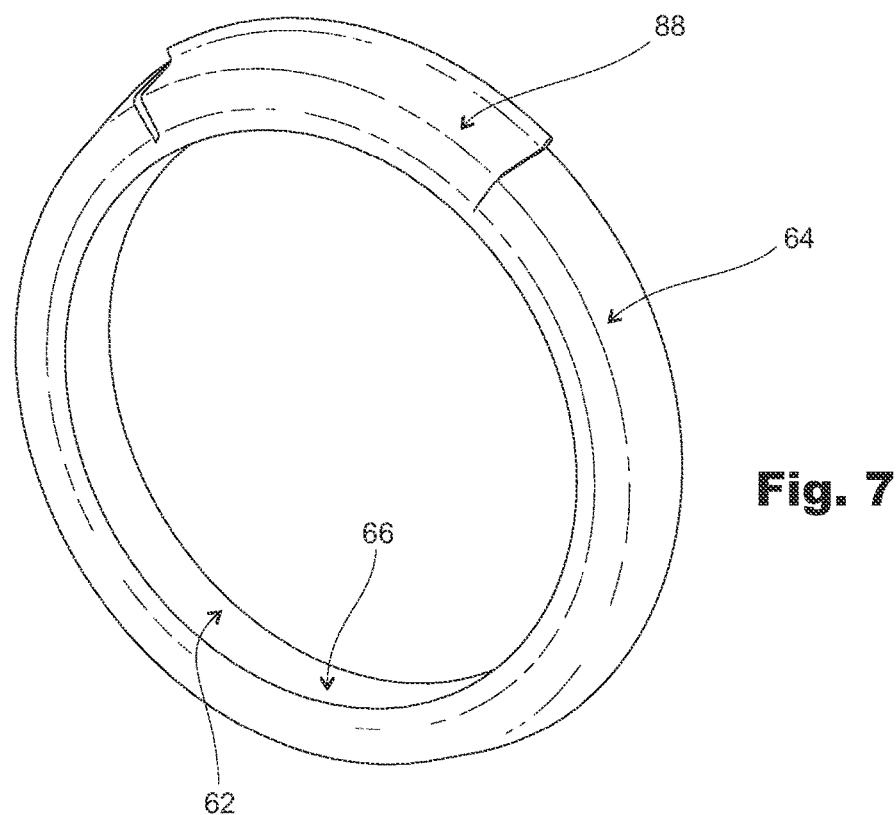
FIG. 7 is a pictorial view of the nested seal, and shows a backing armor plate on an outer surface of the seal.
Figure 8:
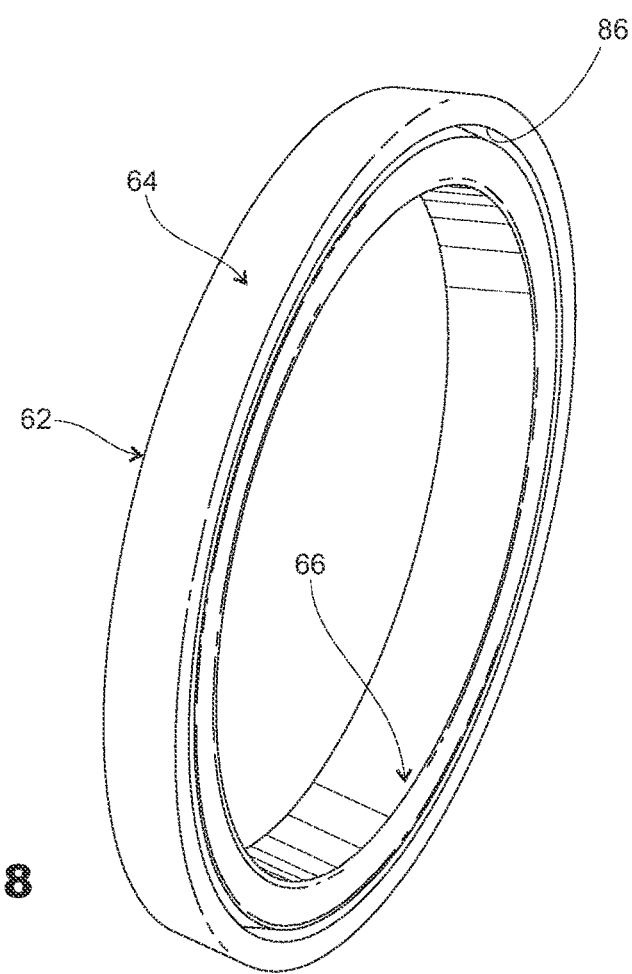
FIG. 8 is a view like FIG. 7, taken at a different angle, and shows the backing armor plate removed.
Figure 11:
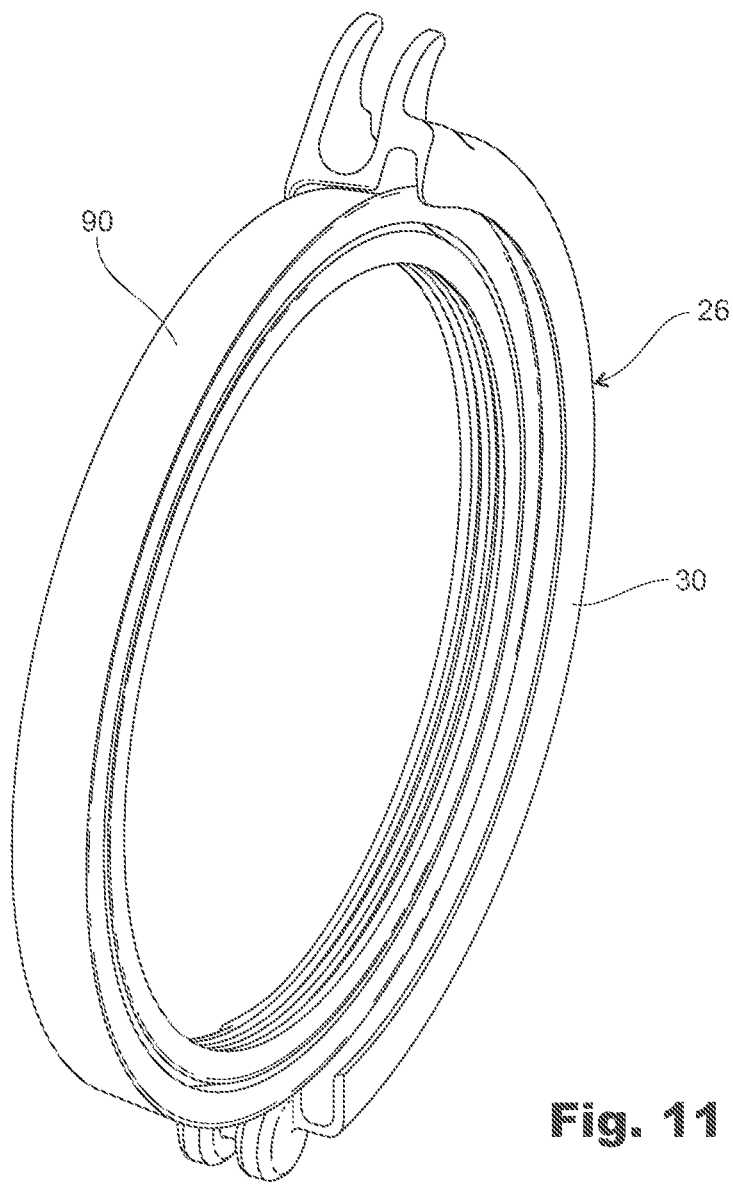
FIG. 11 is a pictorial view like FIG. 4, but shows the inner circumferential portion of the seal removed from the outer one.

Referring to FIG. 7, there is a backing armor piece 88 that fits over a region 90 (shown in FIG. 11) in outer seal part 64. The armor piece 88 rests underneath clamping ring ears 52, 62 and spans the distance or gap between the ears. FIG. 8 shows where the armor piece 88 normally rests on the seal. As the bolt structure 36 is tightened, the armor piece serves to compress the seal 62 and prevents the seal from bulging in the region where the bolt structure 36 is located.

Directing attention now to the bottom of FIG. 4, as was described above, the clamping ring 26 consists of two separate parts 30, 32. These parts 30, 32 may swing or move toward and away from each other because they are connected at pivot point 34.

As is apparent from the above description, the ears 52, 62 may open relative to each other. When this happens, it creates a space or gap at the location indicated generally by arrow 92 in FIGS. 3 and 4. In that circumstance, the parts 30, 32 of the clamping ring 26 are "pivoting." As the clamping ring 26 is tightened, however, the edges 94, 96 of each respective clamping ring part 30, 32 come into abutting contact with each other at a reinforced region (see FIG. 6) and constrain or stop further free-pivoting movement. At that particular point, because clamping rings 30, 32 cease moving freely, further clamp tightening is accomplished by bending within the integrated structure of parts 30, 32. In other words, the clamping ring 26 then begins to function as though it is a "unitary" ring made of a single piece.

Figure 17:
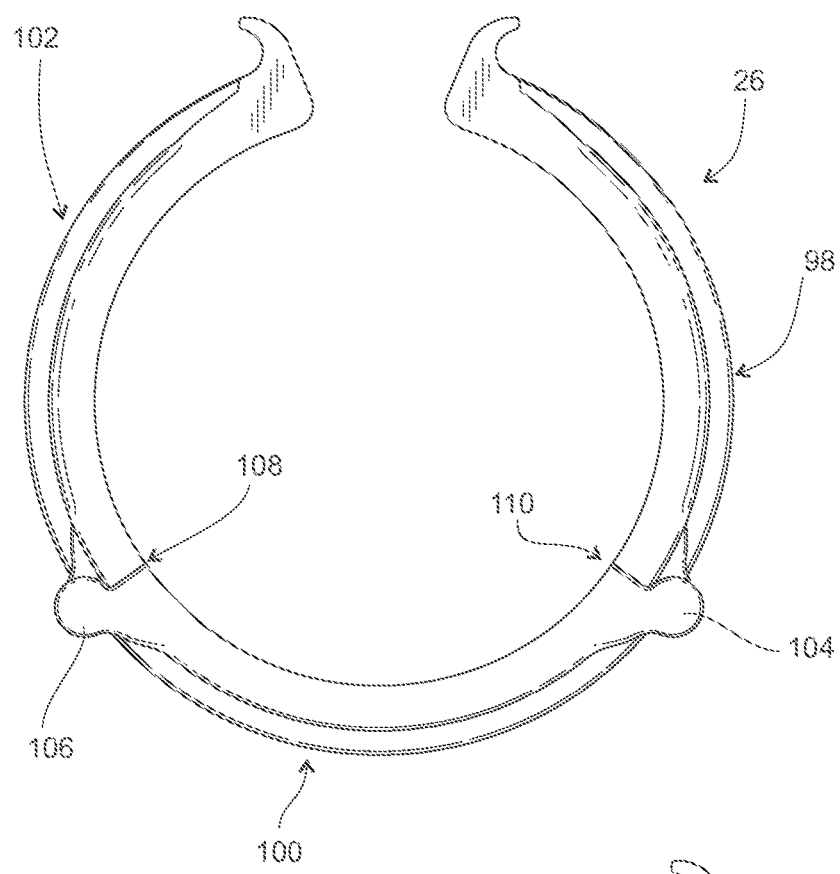
FIG. 17 is a frontal view of an alternative embodiment of a clamping ring that functions like the clamping ring illustrated in FIG. 4.
Figure 18:
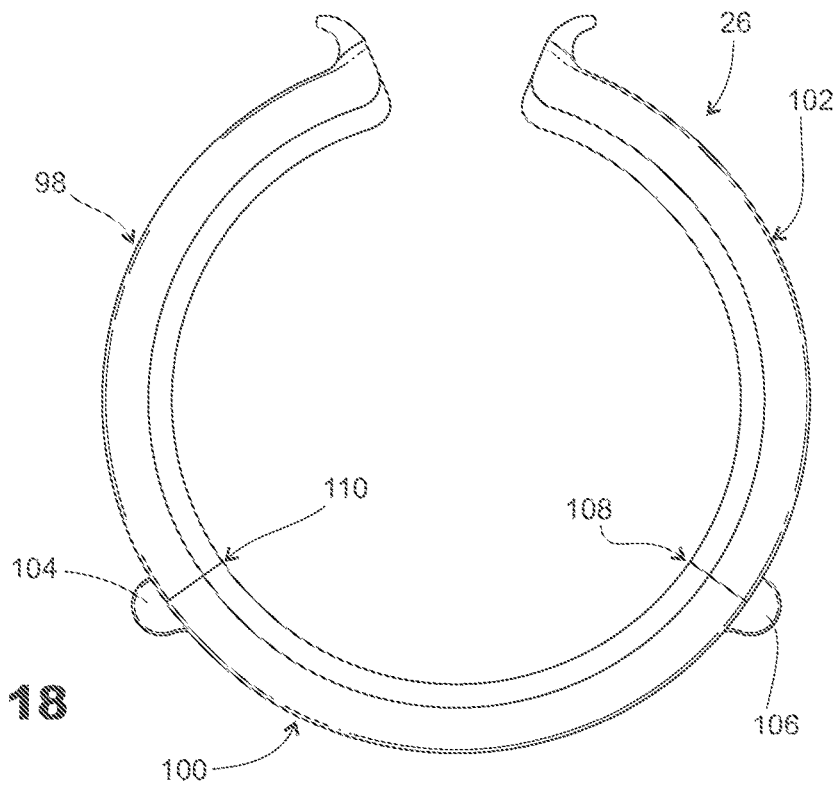
FIG. 18 is a view like FIG. 17, but is taken looking at the opposite side of the clamping ring.

Finally, an alternative embodiment of clamping ring 26 is illustrated in FIGS. 17 and 18. Directing attention there, the alternative embodiment consists of a ring that is segmented into three parts 98, 100, 102. Each part is connected together at 104, 106 by the same type of hook and pin connection described earlier. These connections create pivot points that enable ring segments 98, 100, 102 to swing freely relative to each other when the clamping ring 26 is unbolted. However, as one separate portion swings relative to the other in a closing motion, the two portions eventually become ironbound in the same manner as described above. This occurs at the locations indicated at 108 and 110, respectively. The iron-binding or bounding effect enables a three-segment ring to function as a single unitary ring at a certain tightening point. The advantage to this design is that the compressive forces created by the ring are distributed more evenly. Likewise, the nested seal 62 receives evened-out compression around its circumference.

U.S. patent application Ser. No. 13/893,049, to which this application claims priority, is hereby incorporated herein by reference in its entirety.

The foregoing is not intended to limit the scope of patent coverage. The scope of patent coverage is intended to be limited by the patent claims, the interpretation of which is to be made in accordance with the established doctrines of patent claim interpretation.

The invention claimed is:

1. A pipe coupling, comprising:
a sleeve including a flange at an end of the sleeve, the flange having an axially outwardly directed face; and
a clamping ring mounted to the flange, the clamping ring carrying a nested seal having an inner circumferential seal nested within an outer circumferential seal, the clamping ring including first and second clamping ring portions, the first and second clamping ring portions functioning as a unitary ring when a first bearing face of the first clamping ring portion is brought into abutting contact with a second bearing face of the second clamping ring portion such that the first and second clamping ring portions are rotatably fixed relative to one another, the clamping ring including a surface to urge an inwardly directed face of the nested seal axially against the axially outwardly directed face of the flange as the first and second clamping ring portions are moved toward one another.

2. The pipe coupling of claim 1, wherein the outer circumferential seal includes an annular groove that faces the flange, a diameter of the annular groove is greater than an inner diameter of the flange when the nested seal is in a non-compressed condition, and the diameter of the annular groove is less than the inner diameter of the flange when the nested seal is in a compressed condition.

3. The pipe coupling of claim 1 wherein when the first bearing face is brought into abutting contact with the second bearing face, the first and second bearing faces are substantially aligned along a plane extending through a center of the clamping ring.

4. The pipe coupling of claim 1 wherein when the first bearing face is brought into abutting contact with the second bearing face, the first bearing face engages the second bearing face only in compression.

5. The pipe coupling of claim 1 wherein the first and second clamping ring portions are removably connected together by a first coupling portion of the first clamping ring portion and a second coupling portion of the second clamping ring portion so that the first and second clamping ring portions are separable from one another.

6. The pipe coupling of claim 1 wherein the surface is an outwardly convergent sloped surface.

7. The pipe coupling of claim 6 wherein the outwardly convergent sloped surface urges the nested seal axially against the axially outwardly directed face of the flange and compresses the nested seal radially inwardly against the outside of a pipe as the first and second clamping ring portions are moved toward one another.

8. The pipe coupling of claim 1, further comprising a fastener to bring the first bearing face of the first clamping ring portion into abutting contact with the second bearing face of the second clamping ring portion.

9. The pipe coupling of claim 1 wherein the clamping ring includes the surface to force the nested seal radially inward as the first and second clamping ring portions are moved toward one another.

10. A pipe coupling, comprising:
a sleeve including a flange at an end of the sleeve; and
a clamping ring mounted to the flange, the clamping ring carrying a seal, the clamping ring including first and second clamping ring portions, the first and second clamping ring portions functioning as a unitary ring when a first bearing face of the first clamping ring portion is brought into abutting contact with a second bearing face of the second clamping ring portion such that the first and second clamping ring portions are rotatably fixed relative to one another;
wherein the seal includes an inner circumferential seal nested within an outer circumferential seal and the inner circumferential seal includes a plurality of outer peripheral ridges that mate with a corresponding plurality of inner peripheral grooves on an inner surface of the outer circumferential seal.

11. A pipe coupling, comprising:
a sleeve including a flange at an end of the sleeve; and
a clamping ring mounted to the flange, the clamping ring carrying a seal, the clamping ring including first and second clamping ring portions, the first and second clamping ring portions functioning as a unitary ring when a first bearing face of the first clamping ring portion is brought into abutting contact with a second bearing face of the second clamping ring portion such that the first and second clamping ring portions are rotatably fixed relative to one another;

wherein the clamping ring includes exactly two clamping ring portions.

* * * * *